United States Patent [19]

Supcoe et al.

[11] Patent Number: 5,571,314

[45] Date of Patent: Nov. 5, 1996

[54] FORMULATION AND PREPARATION OF A GEL SYSTEM FOR THE PROMOTION OF RAPID SOLVATION IN AQUEOUS SYSTEMS

[75] Inventors: Robert F. Supcoe, Annapolis; Ira M. Felsen, Greenbelt, both of Md.

[73] Assignee: The United States of America as represented by the Secretary of the Navy, Washington, D.C.

[21] Appl. No.: 391,419

[22] Filed: Aug. 24, 1973

[51] Int. Cl.⁶ ..................................................... C08L 15/00
[52] U.S. Cl. ........................ 523/175; 106/205.6; 114/271
[58] Field of Search ...................... 260/29.6 H; 106/209, 106/208; 114/20 R, 271

[56] References Cited

U.S. PATENT DOCUMENTS

| | | | |
|---|---|---|---|
| 3,196,823 | 7/1965 | Thurston | 114/20 R |
| 3,230,919 | 1/1966 | Crawford | 114/20 R |
| 3,382,831 | 5/1968 | Madison | 114/20 R |
| 3,382,832 | 5/1968 | Swanson | 114/20 R |
| 3,422,026 | 1/1969 | Wright | 106/277 |
| 3,435,796 | 4/1969 | Merrill | 114/20 R |
| 3,575,123 | 4/1971 | Shepherd | 114/20 R |
| 3,615,791 | 10/1971 | Thomas | 106/208 |
| 3,615,798 | 10/1971 | Woodruff | 106/277 |
| 3,734,873 | 5/1973 | Anderson | 260/29.6 H |

Primary Examiner—Peter A. Nelson

[57] ABSTRACT

A thixotropic slurry is used as a drag reducing agent for water borne vessels. The slurry comprises a polymer, a carrier, a surfactant and a dispersant. The slurry is buffered against changes in pH which can be the cause of separation of the constituents during storage in the vessel. The slurry also has a more rapid initial drag reduction response time since the polymer is coated with a monomolecular layer of surfactant.

11 Claims, No Drawings

FORMULATION AND PREPARATION OF A GEL SYSTEM FOR THE PROMOTION OF RAPID SOLVATION IN AQUEOUS SYSTEMS

The invention described herein may be manufactured and used by or for the Government of the United States of America for governmental purposes without the payment of any royalties thereon or therefor.

BACKGROUND OF THE INVENTION

Turbulence in the boundary layer of flow adjacent to a waterborne vessel causes a considerable drag force between the vessel and the sea. It has been discovered that high molecular weight polymers when injected into the boundary layer, reduce the turbulence and the associated drag forces. These polymers in the prior art were initially used only immediately after being hydrated to form a mucilaginous liquid. The polymers when mixed with water, were not stable in storage, so a specific and relatively complex apparatus was required to mix the polymer immediately before its injection into the flow stream; for example, see U.S. Pat. No. 3,286,674 issued Nov. 22, 1966 to Thompson. To meet the need for having the polymer drag reducing agents pre-mixed and instantly available for use, slurries were developed. Slurries in this context are mixtures of one or more polymers, a carrier, a surfactant and a dispersing agent. The carrier is the media in which the polymer is suspended to form a gel like liquid. The surfactant is provided to enhance the mixing of the polymer and water upon injection by decreasing the surface tension of the water when the slurry is introduced into the flow stream. The dispersing agent maintains the polymer evenly dispersed throughout the colloidal mixture. This combination of materials provides a slurry which can be stored and are available for instant use. Upon injection into the flow stream, the resin dissolves or is leached out of the carrier and it performs its drag reducing function.

Unfortunately, the slurries of the prior art have a limited storage life and have a relatively slow rate of solvation which limits their utility and effectiveness. Changes in the pH and temperature cycling of the slurry during storage cause settling of the polymer in the carrier and thus rendering the slurry inoperative. In addition, delays in the solvation of the polymer decrease the effectiveness of the slurry upon injection. Though the prior slurries have included a surfactant to accelerate the solubility of the polymer in the seawater, the surfactants have been dispersed throughout the slurry and not concentrated around the polymer particles where it would be most effective. The result is that the polymer formed pituitous gel string formations of agglomerated resin upon injection. The larger these strings, the more the polymer resists hydration.

SUMMARY OF THE INVENTION

This improved slurry formulation has a longer storage life and a rapid rate solvation upon injection into the boundary layer. The stable slurry maintains an even distribution of the polymer resin after mixing until it is used. This is accomplished by means of the use of an amphoteric surfactant which buffers the slurry against changes in pH. Also the surfactant system serves a dual purpose, that is, the dodecyl sodium sulfate solvates partially in the slurry system and compliments the cocoamine/crotonic acid amphoteros complex in providing a substantially monomolecular sheath of surfactant over the polymer particles in the slurry. Upon hydration by injection of the slurry into the boundary layer immediate solvation occurs since the surface tension of the water immediately adjacent the polymer is decreased by the surfactant sheath. This slurry differs from application number Navy Case 52,920, Ser. No. 184,995, filed Sep. 30, 1972, by providing a more rapid solvation and its adaptability to a wider range of carrier liquids.

OBJECTS OF THE INVENTION

It is an object of this invention to provide an improved stable, storable drag reducing slurry. It is another object of the invention to provide a slurry which is capable of substantially instant solvation upon injection into the flow stream.

DESCRIPTION OF THE INVENTION

The slurry of this invention maintains an even distribution of poller and constituents over a long period of storage. The slurry solvation occurs rapidly upon injection into the boundary layer.

The enhanced solvation occurs due to the use of a combination of an anionic surfactant and an amphoteric surfactant in the slurry system. The surfactants are combined such that one assists the other as a dispersant and each serving the primary function of either buffering or promoting rapid solvation of the slurry upon injection into the aqueous media. Since changes in the wide pH of a solid/liquid suspension during storage may affect the storage stability of the slurry, a system of surfactants that are useful in a wide pH range are used. A combination (two or more) tend to perform better than a single surfactant.

One of the two combined surfactants must be amphoteric and the other anionic. The amphoteric surfactants contain both cationic and anionic groups. The cationic center is an amine group and the anionic properties are provided by the carboxylic group. When the anionic and cationic properties balance in solution the double ion is both positive and negative at the same time. The surfactant is amphoteric if this is obtained. In this state, the surfactant possesses a isoelectric range in which it exhibits special properties which tend to stabilize the slurry system. One explanation of its stabilizing function is that it acts as a buffer against slight changes in pH. It also assists the dispersant by strengthening the theoretical lattice structure of the carrier liquid and the dispersant. Of course, the amphoteric surfactant also complements the solvating action of the water by lowering its surface tension and permitting rapid flow of water around the polymer particle upon contact thereby preventing clumping or string formation such as typically occurs with the use of some prior art drag reducing polymers. Among the amphoteric surfactants which may be used are: Armine Z made by the Armour Company (which is a reaction condensation product of cocoamine and crotonic acid), N-alkyl betaine, amino acids, disodium N-lauryl beta iminodiproionate, and cationic amine salts. The amphoteric surfactant may constitute from 0.1–1.0% of the slurry by weight.

The anionic surfactant, in a range of 0.1–0.4% of the slurry by weight, is combined to act with the amphoteric surfactant. Together the surfactants tend to complement each other's solvating action. The solubility is accelerated when the anionic and amphoteric surfactants are used in combination. No such acceleration takes place when a cationic surfactant is used with the amphoteric surfactant. Among the anionic surfactants which may be used are: dodecyl sodium sulfate, napthalene sulfonate, polyethylene polypropylene glycol ethers and aryl alkyl sulfonates.

An example of a slurry of this invention consists of the addition of approximately 1–5% by weight of a fumed silica and 0.5–2.5% by weight of an organic derivative of a montmorrilonite clay that has been pre-damped with a mixture of 95% methyl alcohol and 5% water, a carrier
} comprising approximately 56% by weight of polyethylene glycol, a combination of surfactants comprising 0.5–1.0% by weight of Armine Z and 0.1–0.4% by weight of dodecyl sodium sulfact, and approximately 40% by weight polyacrylamide resin.

The dispersant, carrier and amphoteric surfactant (Armine Z) are mixed to form a thixotropic gel. The anionic surfactant (dodecyl sodium sulfate) is then added. Finally, the polymer resin is added to complete the slurry. The result is a slurry which has the above described properties and is thixotropic as well.

The range of polymer resin for this slurry is from 0.0+ to 50%. Possible polymers which may be used are polyacrylamide resin, polyethylene oxide resin, carrageen, guargum and gum ocra. Other polymers with drag reducing capabilities may be used.

The carrier should be selected for its slow rate of evaporation, and low freezing point. The carrier is preferably inert to the resin and in a liquid state at operational temperatures. Among the carriers which may be selected are polyethlene glycol, hydrocarbons, fluoronated hydrocarbons, mineral oil, silicone fluids, freon primary alcohols isopropanol, polypropylene carbonate, butoxy, ethoxytriglycol, 1-butoxyethoxy -2-propanol, ethyleneglycol diacetate, triacetin, and methoxytriglycol.

The dispersant acts to create a lattice-like structure which tends to provide an even distribution of polymer particles throughout the carrier. These may be, for example, fumed silica, or organic derivatives of montmorillionite clay (Bentone 27, 38). The dispersant will be in the range of 1–5% by weight of the slurry.

Obviously many modifications and variations of the present invention are possible in the light of the above teachings. It is therefore to be understood that within the scope of the appended claims the invention may be practiced otherwise than as specifically described.

What is claimed is:

1. A ship's drag reducing slurry comprising:

|  | % by weight |
| --- | --- |
| a high molecular weight water soluble polymer | 0+–50%; |
| a carrier, inert with respect to the polymer | 40–99%; |
| a dispersant | 1–5%; |
| a first surfactant | 0.1–1.0% and |
| a second surfactant | 0.1–0.4%. |

2. The slurry of claim 1, wherein:
said high molecular weight polymer is selected from the group of polyethylene oxide, polyacrylamide resin, carageen, guargum and gum ocra.

3. The slurry of claim 1, wherein:
said polymer is selected to have the following characteristics:
 (1) non-soluble in the carrier;
 (2) inert when suspended in the carrier; and wherein said carrier is selected to have the following characteristics:
 (1) a high flash point;
 (2) a low freezing point;
 (3) highly soluble in water.

4. A slurry of claim 1, wherein:
said carrier is a material selected from the group of polyethylene glycol, hydrocarbons, fluronated hydrocarbond, mineral oil, silicon fluids, freon, primary alcohols, isoproponal, polypropylene carbonate, butoxyethoxytriglycol, 1-butoxyethoxy-2 propanol, ethyloneglycol diacetate, triacetin, and methoxytriglycol.

5. The slurry of claim 1 wherein:
said dispersant is a material selected from the group consisting of an organic derivative of montmerillonite clay, or fumed silica.

6. The slurry of claim 1 wherein:
said slurry is thixotropic.

7. The slurry of claim 1, wherein:
said first surfactant is amphoteric.

8. The slurry of claim 1 wherein:
said amphoteric surfactant is selected from among the group of Armine Z (a reaction condensation product of cocoamine and crotonic acid), N-alkyl betaine, amino acids, disodium N-lauryl beta imino dipropionate and cationic amine salts.

9. The slurry of claim 1 wherein:
said second surfactant is anionic.

10. The slurry of claim 1 wherein:
said anionic surfactant is selected from the group consisting of dodecyl sodium sulfate, napthalene sulfonate, polyethylene polypropylene glycol ethers and alkyl sulfonate.

11. The slurry of claim 1 wherein:
said first surfactant is an amphoteric surfactant; and
said second surfactant is an anionic surfactant.

* * * * *